(12) United States Patent
Ismond

(10) Patent No.: US 12,151,960 B2
(45) Date of Patent: *Nov. 26, 2024

(54) WASTEWATER TREATMENT SYSTEM AND METHODS UTILIZING CHEMICAL PRE-TREATMENT AND FOAM FRACTIONATION

(71) Applicant: AQUA-TERRA CONSULTANTS, Bellevue, WA (US)

(72) Inventor: Alan Ismond, Bellevue, WA (US)

(73) Assignee: AQUA-TERRA CONSULTANTS, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,215

(22) Filed: Nov. 7, 2022

(65) Prior Publication Data

US 2023/0070706 A1    Mar. 9, 2023

Related U.S. Application Data

(63) Continuation of application No. 17/599,943, filed as application No. PCT/US2020/025241 on Mar. 27, 2020, now Pat. No. 11,518,699.

(Continued)

(51) Int. Cl.
*C02F 1/24* (2023.01)
*C02F 1/32* (2023.01)
(Continued)

(52) U.S. Cl.
CPC .......... *C02F 9/00* (2013.01); *C02F 2001/007* (2013.01); *C02F 1/24* (2013.01);
(Continued)

(58) Field of Classification Search
CPC ...... C02F 9/00; C02F 1/24; C02F 1/32; C02F 1/5245; C02F 1/66; C02F 1/722;
(Continued)

(56) References Cited

U.S. PATENT DOCUMENTS 4,081,403 A    3/1978 Takegami et al.
4,609,470 A    9/1986 Chung et al.
(Continued)

FOREIGN PATENT DOCUMENTS

WO    2004/106240 A1    12/2004
WO    2011/149360 A1    12/2011
(Continued)

OTHER PUBLICATIONS

Nayab Ul Hossain, "Treatment of textile waste water using natural catalyst (chitosan and microorganism)", Journal of Textile Engineering & Fashion Technology, published 2018, vol. 4, Issue 5. (Year: 2018).*

*Primary Examiner* — Joseph W Drodge
(74) *Attorney, Agent, or Firm* — Seed IP Law Group LLP

(57) ABSTRACT

A two-step process for recovering useable solids from food processing wastewater and for significantly reducing the pollutants, chemical, bacterial, and viral load. The first step is the addition of pretreatment chemicals such as metal-based coagulant, pH adjuster, oxidant or a combination thereof. The second step is pumping the chemically pretreated wastewater into a foam fractionation system where a gas is introduced into the chemically treated wastewater to create a rising foam that captures and remove solid materials from the remaining wastewater effluent. The solids are recovered for additional post-processing and the effluent is discharged for post-processing or to existing bodies of water.

20 Claims, 7 Drawing Sheets

Related U.S. Application Data

(60) Provisional application No. 62/826,428, filed on Mar. 29, 2019.

(51) Int. Cl.
  *C02F 1/52* (2023.01)
  *C02F 1/66* (2023.01)
  *C02F 1/72* (2023.01)
  *C02F 9/00* (2023.01)
  C02F 1/00 (2023.01)
  C02F 101/38 (2006.01)

(52) U.S. Cl.
  CPC .............. *C02F 1/32* (2013.01); *C02F 1/5245* (2013.01); *C02F 1/66* (2013.01); *C02F 1/722* (2013.01); *C02F 2101/38* (2013.01)

(58) Field of Classification Search
  CPC .. C02F 2001/007; C02F 2101/38; C02F 1/52; C02F 1/5209; C02F 1/5236; C02F 1/5281; C02F 1/68; C02F 1/685; C02F 1/686; C02F 1/687; C02F 1/72; C02F 11/00; C02F 11/006; C02F 2101/16; C02F 2101/30; C02F 1/56; C02F 1/74; C02F 1/78; C02F 2103/22; C02F 2303/12
  See application file for complete search history.

(56) References Cited

U.S. PATENT DOCUMENTS

| | | | |
|---|---|---|---|
| 4,744,903 A | 5/1988 | McAninch et al. | |
| 4,790,943 A | 12/1988 | Dunn et al. | |
| 7,048,854 B1 | 5/2006 | Lee et al. | |
| 7,105,094 B1 | 9/2006 | Lee et al. | |
| 7,344,647 B2 | 3/2008 | Stewart | |
| 7,446,215 B2 | 11/2008 | Lee | |
| 7,481,937 B2 | 1/2009 | Rice et al. | |
| 8,465,651 B2 | 6/2013 | Fischmann | |
| 8,518,269 B2 | 8/2013 | Fischmann | |
| 9,051,193 B2 | 6/2015 | Fischmann | |
| 9,062,471 B2 | 6/2015 | Fischmann | |
| 9,517,953 B2 | 12/2016 | Carnahan et al. | |
| 10,163,199 B2 | 12/2018 | Gilmore et al. | |
| 10,532,298 B2 | 1/2020 | Sinha et al. | |
| 11,518,699 B2* | 12/2022 | Ismond | C02F 9/00 |
| 2002/0195398 A1 | 12/2002 | Morse et al. | |
| 2003/0141254 A1 | 7/2003 | Stewart | |
| 2003/0201232 A1 | 10/2003 | Cheyne | |
| 2005/0161406 A1* | 7/2005 | Eades | C02F 1/24 |
| | | | 210/723 |
| 2005/0247639 A1* | 11/2005 | Harmon | C02F 3/1294 |
| | | | 210/703 |
| 2006/0016759 A1 | 1/2006 | Lee | |
| 2006/0157425 A1 | 7/2006 | Rice et al. | |
| 2006/0175263 A1 | 8/2006 | Rice et al. | |
| 2008/0023407 A1 | 1/2008 | Eriksson et al. | |
| 2010/0108615 A1 | 5/2010 | Christophersen et al. | |
| 2013/0164836 A1 | 6/2013 | Licamele et al. | |
| 2014/0190896 A1 | 7/2014 | Dickson | |
| 2014/0251919 A1 | 9/2014 | Man et al. | |
| 2014/0251920 A1 | 9/2014 | Man et al. | |
| 2016/0145533 A1 | 5/2016 | Tchoukanova et al. | |
| 2017/0066671 A1 | 3/2017 | Carnahan et al. | |
| 2017/0240448 A1 | 8/2017 | Lembcke et al. | |
| 2017/0266587 A1 | 9/2017 | Sinha et al. | |
| 2018/0170782 A1 | 6/2018 | Mcmillan et al. | |
| 2018/0177162 A1 | 6/2018 | Segovia Quintero | |
| 2018/0273413 A1 | 9/2018 | Reid | |
| 2019/0002321 A1 | 1/2019 | Grönfors et al. | |
| 2019/0071339 A1 | 3/2019 | Lilly | |
| 2019/0389741 A1 | 12/2019 | Man et al. | |

FOREIGN PATENT DOCUMENTS

| | | |
|---|---|---|
| WO | 2013/058761 A1 | 4/2013 |
| WO | 2017/178356 A1 | 10/2017 |
| WO | 2018/083594 A1 | 5/2018 |
| WO | 2020/153846 A1 | 7/2020 |
| WO | 2020/205526 A1 | 10/2020 |

* cited by examiner

WASTEWATER TREATMENT SYSTEM AND METHODS UTILIZING CHEMICAL PRE-TREATMENT AND FOAM FRACTIONATION

BACKGROUND

Technical Field

The present disclosure is directed to wastewater treatment system and methods and more specifically, to systems and methods utilizing chemical pre-treatment to flocculate and coagulate wastewater and foam fractionation to separate and recover solids from remaining treated wastewater effluent.

Description of the Related Art

Wastewater from food processing plants, such as poultry and meat slaughterhouses, seafood processing plants, and other types of food processing plants, often contains high levels of unrecovered organic product which can have an adverse environmental impact if discharged to a local treatment plant or directly to various bodies of water, such as streams, lakes, reservoirs, or the ocean. As such, various governmental bodies have imposed limits on such food processing plants through wastewater discharge permits, which establish acceptable chemical and organic matter limits on wastewater that is to be discharged from the processing plant to treatment plants or to bodies of water. In addition, private parties, such as owners of waste treatment plants, fertilizer processing plants, compost processing plants, and landfills, have imposed restrictions on the composition of incoming products, and have refused to accept waste containing certain chemicals, bacteria, and viruses.

Prior responses to meet the chemical and organic matter limits imposed above have included treatment of wastewater with a variety of coagulants to create a very fine floc that is difficult to recover and dewater unless additional flocculants are added. For example, polyacrylamide-based anionic polymers have been used in combination with Dissolved Air Flotation (DAF) systems and methods to separate the resultant sludge from remaining wastewater. Then, the wastewater was discharged to existing outfalls and the sludge was sent to one of several locations for additional processing, including rendering plants to make feeds, composting plants to make fertilizer, or to landfills. However, prior regulations and wastewater discharge permits governing the treated wastewater and the solid material separated from the wastewater allowed for compliance even though environmentally harmful chemicals, bacteria, and viruses are present in the wastewater, the solids, or both.

With a growing emphasis on minimizing chemical contaminants in food and water, and a product premium that comes with organic certification for feeds and fertilizers, there is growing pressure to phase out sludge with polyacrylamides, and other harmful chemicals, bacteria, and viruses. For example, landfills are refusing to accept this sludge due to leachate and space concerns. In response, governmental agencies have enacted new regulations and wastewater discharge permit requirements that significantly reduce or limit the type and concentration of environmentally harmful chemicals, bacteria, and viruses that may be present in wastewater and solid material separated from the wastewater prior to further downstream processing. Instead, the new regulations and permits only allow for use of more environmentally friendly chemicals, and contain new limits on bacteria and virus content in wastewater and solids.

These new regulations have significantly hindered the efficiency and efficacy of existing wastewater treatment systems and methods in removing solid material from wastewater. More specifically, existing processes are only able to achieve separation of solid material utilizing restricted chemicals and are not adapted to efficiently separate solid materials using approved chemicals only. Further, to the extent that existing systems and methods can successfully separate the solids, these existing systems and methods fail to meet the requirements concerning bacteria and virus content in the wastewater and the separated solids. In some cases, these regulations and permit requirements have rendered prior systems inoperable, as it is impossible to either remove the solids or satisfy the composition requirements using existing systems and methods.

In response, some wastewater processing plants have treated their wastewater with biological treatment systems. However, these systems usually require physiochemical pretreatment, more space, and a constant and homogeneous supply of wastewater, which create operational inefficiencies and increase cost. In some cases, the wastewater temperature and salinity combined with seasonal operation, such as would be present in a seafood wastewater treatment plant, make biological treatment unpractical.

BRIEF SUMMARY

The present disclosure describes systems, devices, and methods for separating solids from wastewater having high amounts of organic matters (e.g., seafood processing wastewater) using a two-step process in a manner that allows those solids to be recovered for feeds and fertilizer. The resultant wastewater is significantly lower in pollutants (particularly organic pollutants), bacteria and viruses. More specifically, a first step includes chemical pretreatment of incoming wastewater with one or more of pretreatment chemicals such as coagulants/flocculants, pH adjusters, oxidants, and disinfectants (for example, ferric sulfate, peracetic acid, sodium hydroxide, sodium bicarbonate, sulfuric acid, and hydrogen peroxide). The pretreatment chemicals coagulate and flocculate the solid material (e.g., organic matters) in the wastewater while neutralizing or killing certain bacteria and viruses in the solid material and the wastewater. The pretreated wastewater is then provided to a foam fractionation system for further processing in a second step. The second step includes separating the coagulated and flocculated solids using a foam fractionation tower. A foam fractionation tower includes a reservoir wherein a gas-water interface is achieved by injecting air, ozone, or other like gases into the water in the reservoir, which results in production of foam. Solid materials adhere to the foam and rise along the reservoir for collection, leaving clean effluent without solids near a base of the reservoir for discharge to an existing outfall and/or to an ultra-violet disinfectant system.

For example, one or more embodiments of a method include: pretreating wastewater containing organic matters, the pretreating including adding one or more pretreatment chemicals to the wastewater to form a pretreated wastewater mixture, wherein the one or more pretreatment chemicals are metal-based coagulants, pH adjusters, oxidants or a combination thereof; and supplying the pretreated wastewater mixture into a foam fractionation system, whereby the pretreated wastewater mixture is separated into a foamate and an effluent within the foam fractionation system, wherein the foamate comprises foams on which at least a portion of the organic matters are adsorbed.

The method may further include: the one or more pretreatment chemicals including at least two of a metal-based coagulant, a pH adjuster, and an oxidant, or a combination thereof; the one or more pretreatment chemicals being sulfuric acid, ferric sulfate, sodium bicarbonate, sodium hydroxide, hydrogen peroxide, peracetic acid or a combination thereof; the pretreating the wastewater further including adding the metal-based coagulant first, adding the oxidant second, and adding the pH adjuster third to form the pretreated wastewater mixture; the pretreating the wastewater including adjusting a pH of the pretreated wastewater mixture to a level at or below an isoelectric point of the proteins in the wastewater; and the preteating the wastewater further including adding one or more of sulfuric acid, sodium bicarbonate, and hydrogen peroxide to the wastewater to form the pretreated wastewater mixture.

The method may further include: the supplying of the pretreated wastewater mixture into the foam fractionation system including pumping the pretreated wastewater mixture into the foam fractionation system proximate a first end or top of the foam fractionation system opposite a base of the foam fractionation system; the supplying the pretreated wastewater mixture into the foam fractionation system further including operating the foam fractionation system countercurrently; after the supplying, discharging the effluent proximate the base of the foam fractionation tower; after the supplying, discharging the effluent, the discharging including flowing the effluent through at least one of a mesh screen or an ultraviolet treatment system to provide a refined effluent and discharging the refined effluent to a wastewater discharge; after the supplying, discharging the foamate from a first end of the foam fractionation tower opposite a base of the foam fractionation tower; after the discharging the foamate, dewatering the foamate, the dewatering the foamate including separating water from the foamate by gravity separation in a sludge tank; and the dewatering the foamate further including, before separating water from the foamate, adjusting a pH of the foamate and adding chitosan to the foamate.

One or more embodiments of a system include: a chemical pretreatment system, the chemical pretreatment system including: a feed pump; at least one chemical pump downstream from the feed pump and in fluid communication with the feed pump; and a floc tube in fluid communication with the at least one chemical pump and the feed pump; and a foam fractionation system in fluid communication with the chemical pretreatment system, the foam fractionation system including: a reservoir having a fluid inlet, a fluid outlet, and a foamate outlet, the reservoir further including a first end; a gas injection pump in fluid communication with the reservoir through a fluid loop coupled between the gas injection pump and the first end of the reservoir; and a gas source upstream of the gas injection pump and in fluid communication with the gas injection pump.

The system may further include: at least one equalization tank upstream of the feed pump of the chemical pretreatment system and in fluid communication with the feed pump, wherein during operation, the at least one equalization tank provides wastewater to the feed pump; a flow outlet path in fluid communication with the fluid outlet of the reservoir, and a screen in the flow outlet path downstream from the reservoir, wherein the screen receives effluent from the fluid outlet of the reservoir; an ultraviolet treatment system in fluid communication with the flow outlet path downstream from the screen, wherein the ultraviolet treatment system receives effluent from screen and discharges purified effluent to a discharge; and the at least one chemical pump including at least three chemical pumps, wherein a first one of the at least three chemical pumps provides ferric sulfate to wastewater from the feed pump.

The system may further include: a second one of the at least three chemical pumps providing peracetic acid to the wastewater and a third one of the at least three chemical pumps providing sodium hydroxide to the wastewater; a sludge tank in fluid communication with the foamate outlet of the reservoir, wherein the sludge tank receives and holds foamate separated from effluent in the reservoir; a decantate line fluidly connected between the sludge tank and a wastewater sump in fluid communication with the at least one equalization tank and upstream of the at least one equalization tank, wherein during operation, the decantate line provides decantate separated from solid material in the sludge tank to the wastewater sump, where the wastewater sump provides the decantate to the equalization tank in a fluid loop; the gas source being an ozone generator; the at least one chemical pump providing one or more pretreatment chemicals to wastewater in the chemical pretreatment system, wherein the one or more pretreatment chemicals are metal-based coagulants, PH adjusters, oxidants, or a combination thereof; and wherein the one or more pretreatment chemicals are sulfuric acid, ferric sulfate, sodium bicarbonate, sodium hydroxide, hydrogen peroxide, peracetic acid, or a combination thereof.

BRIEF DESCRIPTION OF THE SEVERAL VIEWS OF THE DRAWINGS

For a better understanding of the embodiments, reference will now be made by way of example only to the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

Wastewater having significant amounts of organic matters (e.g., protein, fat, blood) is unsuited for conventional purification systems due to the high biological oxygen demand (BOD), chemical oxygen demand (COD) and total organic carbons (TOC). The present disclosure is directed to separating or recovering solids, especially solids rich with organic matters such as protein and fat, from wastewater in a process involving at least a chemical pretreatment step and a foam fractionation step. The process disclosed herein avoids using polymers such as polyacrylamide, thereby allowing the recovered solids, free of added polymers, to be used for feeds and fertilizer, or to be received in a landfill. The treated wastewater is significantly lower in pollutants, chemicals, bacteria and viruses compared to that of the known processes, such that the treated wastewater can be safely discharged to existing bodies of water with significantly reduced environmental impact. As used herein, "wastewater" refers to "any water that has been affected by human use." While the present disclosure generally describes systems and methods for processing wastewater with organic matters or components, such as, without limitation, poultry and meat processing wastewater, seafood processing wastewater, fruit and vegetable processing wastewater, legume processing wastewater, winery and brewery processing wastewater, cheese processing and other types of food processing plant wastewater, and aquarium wastewater, it is to be appreciated that the embodiments of the present disclosure may be adapted for use with any wastewater according to the definition above and the same is expressly contemplated in the present disclosure. Accordingly, the present disclosure is not limited to food processing wastewater.

In particular, the wastewater contains significant amounts of organic matter. In some embodiments, the wastewater contains at least 0.5% (w/v), or at least 1.0% (w/v), or at least 1.5% (w/v), or at least 2.0% (w/v), or at least 2.5% (w/v), or at least 3.0% (w/v), or at least 3.5% (w/v), or at least 4.0% (w/v), or at least 4.5% (w/v), or at least 5.0% (w/v) organic matter. In certain embodiments, the organic matter may be present in the wastewater as colloidal or particulate solids of proteins, fat, blood, cartilage, etc.

Figure 1:
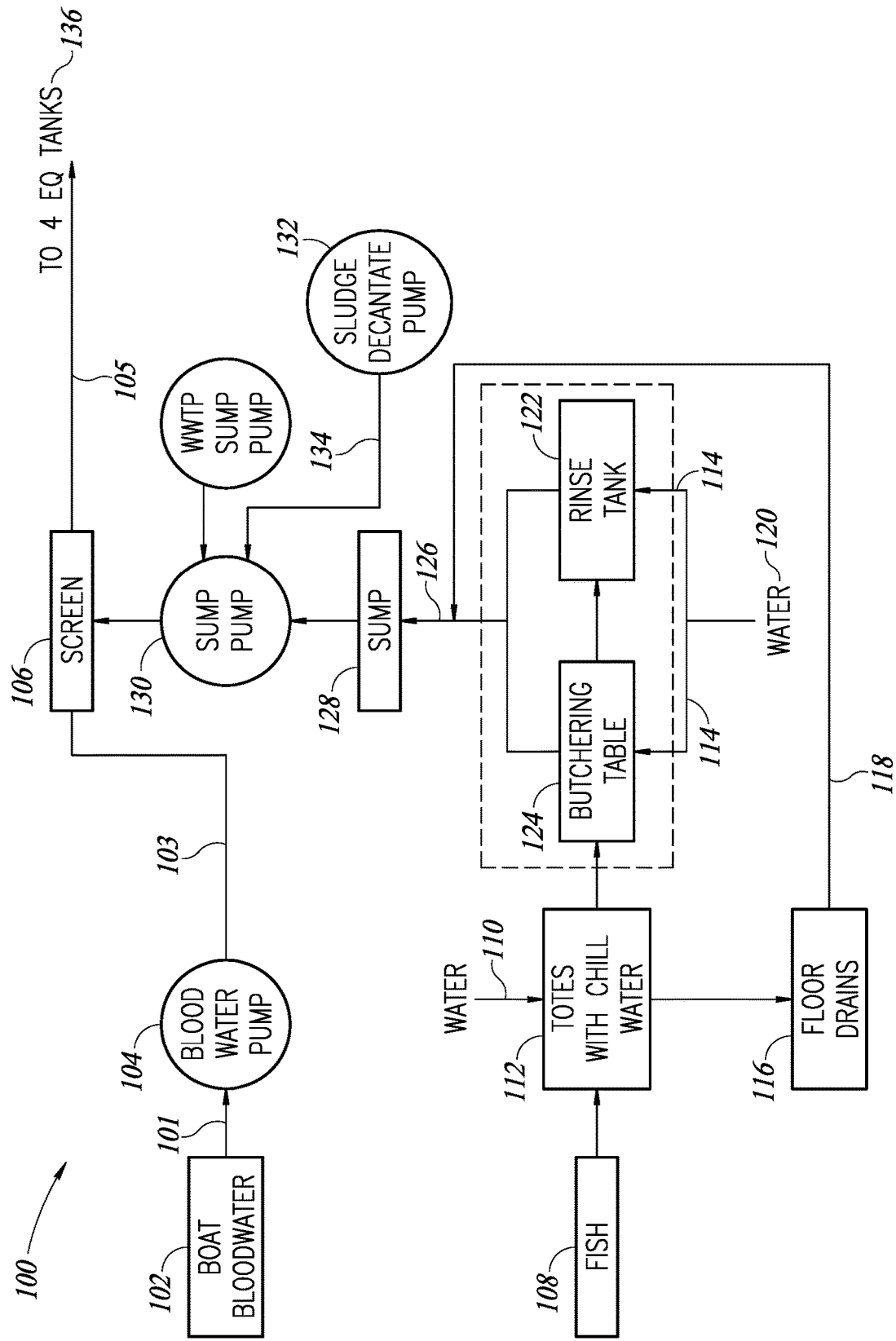
FIG. 1 is a schematic of an embodiment of a system for producing wastewater from salmon processing.

FIG. 1 is a schematic illustration of an embodiment of a system 100 for producing wastewater in a salmon processing plant and serves as an example of how wastewater is generated in a processing plant. As explained further below, seafood wastewater processing systems and methods are described herein as one non-limiting example of the embodiments of the present disclosure. Additional examples are not provided in the interest of brevity and to avoid obscuring the features of the embodiments. However, it is to be appreciated that the systems and methods described herein can be used to process other forms of food processing wastewater and wastewater generally and as such, the present disclosure is not limited to seafood processing wastewater. Rather, processing any type of wastewater is expressly contemplated with the embodiments of the present disclosure.

In an embodiment of salmon wastewater processing, the system 100 includes incoming wastewater 102 from a boat. In farmed salmon processing applications, the wastewater 102 is boat hold water that contains blood and other organic material resulting from harvesting and on-board bleeding of fish, thus creating bloodwater in the boat hold. Harvesting can include catching wild fish (e.g., pole or line caught) as well as catching or harvesting farm raised fish. Further, the boat hold water or blood water is typically combined with fresh or salt water for storing the fish in the boat hold. In wild salmon processing applications, the fish are caught and placed in the hold, either with or without water, and typically are not bled en route to the processing plant. As such, the resulting water in the boat hold may not contain blood, and may generally contain little, if any, organic material. In further applications, fish or other seafood is stored in the boat holds on ice and thus there is generally little water or organic material in the boat hold once the fish or seafood are removed upon arrival at the processing plant. In any event, the contents of the boat hold comprise incoming wastewater 102 that is provided to pump 104, as below.

The wastewater 102 is fed to a pump 104 via line 101, which may be connected to a drain, an upstream screen, or some other inlet for receiving the water 102 and conveying the water 102 along the line 101. The water 102 is pumped by the pump 104 along line 103 to a screen 106. The screen 106 filters out any large organic materials (e.g, fins, etc.) that may be present in wild fish processing applications, as well as any extraneous materials (e.g., hammers, gloves, plastics, etc.) that may be present in the system 100, such as in sump 128 described below. Such extraneous materials can be periodically removed or cleaned from the screen 106 and sent to a landfill or other disposal location.

In some embodiments, the water 102 is then provided to equalization tanks 136 along line 105 for storage prior to additional processing, as described in greater detail below with reference to FIGS. 2-3. In some embodiments, the water 102 or a portion of the water 102 can be discharged to an existing outfall. The water 102 is a portion of the total wastewater collected from system 100. The wastewater in system 100 that is collected in the EQ tanks 136 further includes wastewater from cleaning harvested fish, as described below.

Fish or other seafood 108 that are removed from the boat are combined with water 110 in totes 112 for conveyance from the boat to the processing facility. At the processing facility, the fish 108 are removed from the totes 112 and provided to a butchering table 124 for processing. In farm raised fish processing plants, the fish 108 are gutted at the butchering table 124 and provided whole to a rinse tank 122 for cleaning. In wild caught fish processing embodiments, the fish are filleted at butchering table 124, and the rinse tank 122 is not necessary, as fillets are rinsed with water 120 at the butchering table 124 before packaging. In embodiments that include the rinse tank 122, water 120 is provided to both the rinse tank 122 and the butchering table 124 along lines 114, or in embodiments without the rinse tank, water 120 is provided to the butchering table 124 along line 114.

The excess water 120 from the rinse tank 122 and the butchering table 124, which contains organic matters or materials (e.g., blood, protein, oils, fats, tissues, etc.) and bacteria or viruses are provided to sump 128 along line 126, which may include, in various embodiments, one or more screens, valves, or drains between the rinse tank 122 and the sump 128 and between the butchering table 124 and the sump 128, either at an inlet to line 126, or along line 126. The sump 128 stores and provides the water 120 containing organic materials and bacteria and viruses to a sump pump 130, wherein sump pump 130 provides the water 120 to screen 106. Upon arrival at the screen 106, the process continues according to the above description. It is to be appreciated that in some embodiments, the incoming wastewater 102 may be boat bloodwater that has been combined with salt water in a boat hold, as above. As such, the salt in the water 102 from the boat hold is combined with fresh water 120 from butchering table 124 (or from some other fresh water source in the system 100) to provide wastewater 102 in tanks 136 with a salinity in the range of 5 parts per thousand to 15 parts per thousand, or more or less. As such, certain embodiments of the systems and methods described herein are adapted to process incoming wastewater, such as wastewater 102, with a salinity concentration that is higher than in many other food processing applications.

Water 110 from the totes 112 is provided to a floor drain 116, which in an embodiment, includes multiple floor drains, and is conveyed along line 118. Line 118 joins line 126, such that all of the wastewater from processing the fish 108, with the exception of the initial wastewater 102 from the boat, is provided to the sump 128. In an embodiment, a sludge decantate pump 132 provides decantate from a sludge tank to the sump pump 130, and eventually to the equalization tanks 136 for additional processing in a decantate loop, as described below.

Figure 2:
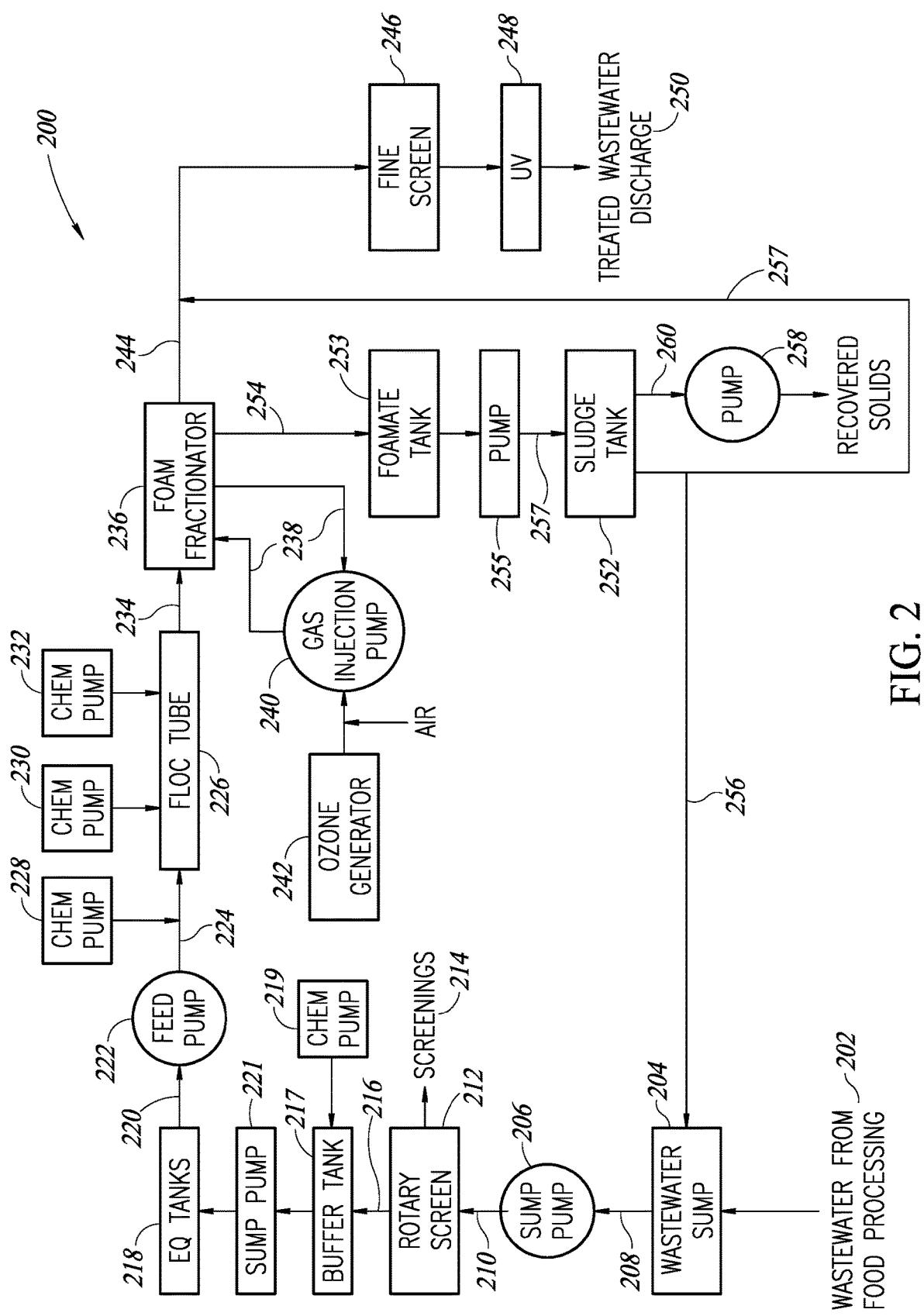
FIG. 2 is a schematic of an embodiment of a system for processing wastewater.

FIG. 2 is a schematic illustrating an embodiment of a generic system 200 for processing wastewater, which in some embodiments, is food processing wastewater. System 200 includes incoming wastewater 202, which is collected in a sump 204. The wastewater 202 includes blood, salt, fats, oils, viruses, and bacteria, among other components and compounds. A sump pump 206 in fluid communication with the sump 204, either directly (e.g., with a pump inlet directly mechanically and fluidly coupled to an outlet of the sump 204) or through a line 208, pumps the wastewater 202 through a rotary screen 212. The rotary screen 212 is connected to the sump pump 206 by line 210.

In an embodiment, the rotary screen 212 includes a wedge wire drum screen, while in other embodiments, the rotary screen 212 includes some other type of rotary screen, such as a panel running screen. The wedge wire drum screen is preferably formed of stainless steel, with screen openings from 0.010 inches to 0.125 inches, or more or less, with through flow capacity up to 20 million gallons per day, or more or less. It is to be appreciated that the flow through capacity of the screen 212 can be higher than a typical flow through capacity of system 200, which may be up to 6 million gallons per day, or more or less. Screenings 214 from the wastewater 202 are sent to a solid waste treatment plant or landfill, as they may contain extraneous materials (e.g. ear plugs, gloves, tools, etc.). The screened wastewater is provided to one or more equalization tanks 218 via line 216, which is fluidly interconnected between the upstream screen 212 and the downstream tank 218. In an embodiment, the system 200 includes a plurality of equalization tanks 218 fluidly connected in series. For example, the plurality of equalization tanks 218 may include one, two, three, four, five, six, seven, eight, nine, ten or more equalization tanks 218 connected in series. Factors that influence the number of tanks 218 present within the system 200 include the total daily flow of the system 200 and available space within the processing plant, among others.

In one or more embodiments, one or more pretreatment chemicals, are added to the screened wastewater before the screened wastewater is transported to the equalization tanks 218.

In one or more embodiments, before the screened wastewater 202 is provided to the equalization tanks 218, the screened wastewater 202 first passes through a buffer tank 217. At the buffer tank 217, one or more pretreatment chemicals may be introduced to the screened wastewater 202 before storage in the equalization tanks 218. For example, the one or more chemicals may include, but are not limited to, one or more of sulfuric acid, ferric sulfate, sodium bicarbonate, sodium hydroxide, hydrogen peroxide, and peracetic acid. The one or more pretreatment chemicals may be added by one or more chemical pumps, such as chemical pump 219 in fluid communication with the buffer tank 217. The chemical pump 219 may be similar to chemical pumps 228, 230, 232 described herein, in some embodiments. The residence time in the buffer tank 217 and the equalization tanks 218 may be selected according to the wastewater to be treated. For example, in some embodiments, the screened wastewater 202 may pass directly through the buffer tank 217 (e.g., a residence time between a few seconds to a few minutes) to be stored in the equalization tanks overnight (e.g. 6 to 14 hours, or more or less). Once the screened wastewater 202 passes through buffer tank 217, a sump pump 221 pumps the screened and chemically pretreated wastewater 202 to the equalization tanks 218 for storage.

As used herein, pretreatment chemicals perform a number of functions to prepare the wastewater before foam fractionation. More specifically, the pretreatment chemicals may act as coagulants or flocculants to cause solid particles in the wastewater to form into bigger masses (e.g., flocs). Other pretreatment chemicals are pH adjusters to bring the pH of the wastewater to a range for optimizing the performance of the other chemicals, including the coagulants or flocculants. Yet other pretreatment chemicals may disinfect or reduce BOD/COD/TOC.

In certain embodiments, the pretreatment chemicals are salts of multivalent metals, such as salts of iron, aluminum, magnesium, or calcium. These metal salts are effective coagulants due to their ability of forming multi-charged polynuclear complexes with enhanced adsorption characteristics. Examples of iron salts include, without limitation, ferric sulfate, ferrous sulfate, ferric chloride, ferric chloride sulfate. Examples of aluminum salts include, without limitation, aluminum sulfate, aluminum chloride, and sodium aluminate. Examples of magnesium or calcium-based coagulants include, without limitation, hydrated lime and magnesium carbonate.

As an alternative to the metal salts, metal-based coagulants may be provided by electrocoagulation. Electrocoagulation uses a direct current source between metal electrodes (e.g., iron or aluminum) immersed in wastewater. The electrical current causes the dissolution of metal electrodes into the wastewater. The dissolved metal ions act in a similar manner as metal salt as metal-based coagulants.

The metal-based coagulants function (e.g., forming polynuclear complexes) efficiently within an optimal pH range. In certain embodiments, the pretreatment chemicals may include one or more pH adjusters. Depending on the pH of the wastewater to be pretreated and the specific metal coagulants used, an acid or base may be combined with metal-based coagulant(s). Examples of the pH adjusters include, without limitation, sulfuric acid, sodium hydroxide, sodium bicarbonate, and the like.

To further reduce the high BOD/COD/TOC loads of the wastewater according to the present disclosure, one or more oxidants may be used to pretreat the wastewater. In particular, oxidants such as peroxides are capable of degrading certain organic matters, as well as disinfecting against bacteria and virus. Examples include, without limitation, hydrogen peroxide and peracetic acid. Peracetic acid is also an acid and may perform the dual functions of a pH adjuster and an oxidant.

In an embodiment where the wastewater 202 is seafood processing wastewater, or some other form of food processing wastewater that is provided on an intermittent basis, activation of the wastewater treatment system 200 depends on when the food processing plant (e.g. the butchering table 124 and the rinse tank 122 in FIG. 1) is running and when there is sufficient inventory of wastewater in the equalization tank 218 to allow for continuous operation of the system 200. In various embodiments, sufficient inventory may mean the equalization tank is at 50% capacity, 60% capacity, 70% capacity, 80% capacity, or 90% or more capacity. In such cases, the decision to activate the system 200 may be made as a result of manual inspection, while in other embodiments, the decision to activate the system 200 is made autonomously based on a control unit in electronic communication with volume or water level sensors in the equalization tank 218, wherein when the capacity of the tank 218 reaches a predetermined threshold, such as any of those identified above, the system 200 automatically activates. In some embodiments, the control unit provides a notification to a user, such as an onsite engineer, when the operational capacity has been reached, in which case, the user manually activates the system.

In some embodiments where the wastewater 202 feed is continuous and in direct relationship to operation of the food processing plant, such as, for example, in continuous meat processing operations, the system 200 may activated along with activation of the food processing plant in general and may remain operational during operation of the plant based on a consistent supply of wastewater 202.

When the system 200 is activated, feed pump 222 is energized and the wastewater 202, after passing through the screen 212, is pumped from the equalization tank 218 through the feed pump 222 and through a floc tube 226. At least one chemical pump 228 is in fluid communication with fluid flowing through the floc tube 226, either directly, or upstream of the floc tube 226 along line 224. For example, in FIG. 2, a first chemical pump 228 is illustrated upstream of the floc tube 226, and second and third chemical pumps 230, 232, respectively, are in fluid communication with the floc tube 226. In yet further embodiments, all of the chemical pumps 228, 230, 232 are in fluid communication with fluid flowing through the floc tube 226, which as described herein, preferably includes a plurality of pipes arranged in series in a serpentine arrangement. Preferably, the system 200 includes at least three chemical pumps 228, 230, 232, wherein the chemical pumps 228, 230, 232 are arranged in sequential order based on the chemicals provided by the respective pumps. Moreover, the pumps are preferably spaced from one another along the flow path through the floc tube 226 in a predetermined amount in order to account for timing of introduction of chemicals to wastewater 202 in the floc tube 226 and appropriate amounts of mixing within the floc tube 226 between chemical additions.

In an embodiment, the first chemical pump 228 provides ferric sulfate to the wastewater 202 flowing through the floc tube 226, the second chemical pump 230 provides peracetic acid to the wastewater 202, and the third chemical pump 232 provides sodium hydroxide to the wastewater 202. In some embodiments, these chemicals are introduced to the wastewater 202 in sequential order, with ferric sulfate first, followed by peracetic acid, and finally, sodium hydroxide, although the same is not necessarily required. For example, the chemicals can be added in any number of different variations of order, such as a reverse order of the above, or any of the above chemicals first, second, and third. When ferric sulfate, peracetic acid, and sodium hydroxide are added to the wastewater 202 in the order above, the ferric sulfate and the peracetic acid lower a pH of the wastewater 202 to a level that is at or below the isoelectric point of the wastewater 202.

It is to be appreciated that the isoelectric point of the wastewater 202 is a reference value that is known or can be calculated for various food processing wastewater. Then, the pH of the wastewater is raised using sodium hydroxide to acceptable levels, which in an embodiment, is between 6.5 and 7.5. Further, the ferric sulfate and peracetic acid coagulate and flocculate solid organic materials in the wastewater 202. Moreover, the peracetic acid and the sodium hydroxide may sterilize various bacteria and viruses present in the wastewater 202, including in the solids. It is to be appreciated that in other embodiments, not all three of these chemicals are required, but rather, depending on the composition of the wastewater 202 to be treated, only one or two of these chemicals may be preferable. Further, it will be appreciated that other wastewater processing systems and methods will utilize different chemicals, including additional chemical pumps (e.g., more than 3 chemical pumps) and the present disclosure contemplates use of the same. For example, the chemicals used to treat the wastewater 202 before, at, or after the floc tube 226 may be, but are not limited to, any one or more of ferric sulfate, peracetic acid, sodium hydroxide, sodium bicarbonate, sulfuric acid, or hydrogen peroxide, either alone or in combination. These chemicals may be added to wastewater 202 in any order and with any number of chemical pumps, either before, at, or after the floc tube 226. In one non-limiting example, one or more of the pretreatment chemicals described herein can be added directly to the buffer tank 217 via chemical pump 219 and/or directly to the equalization tanks 218, which are both upstream of the floc tube 226. In other words, selection of chemicals, chemical pumps, the order of the pumps and of adding chemicals, and chemical concentration is based on the properties of the wastewater 202 input to the system, with the chemicals and ordering specified above merely being one non-limiting example.

The chemically pretreated wastewater is then discharged from the floc tube 226 into a foam fractionation tower 236 via line 234. An embodiment of a foam fractionation tower 236 or a foam fractionation system will be described in additional detail with reference to FIG. 4. However, briefly, the foam fractionation tower 236 can be operated in a concurrent or counter current flow mode, wherein in either flow mode, the fractionator 236 receives the chemically pretreated wastewater from the floc tube 226. Gas is injected into the foam fractionation tower 236 via gas injection pump 240, which is in fluid communication with the foam fractionation tower 236 via a fluid loop 238. For example, the gas injection pump 240 receives wastewater from the foam fractionation tower 236, injects it with gas, and returns the wastewater with injected gas to the foam fractionation tower 236.

The injected gas creates a pneumatic foam within the foam fractionation tower 236 that bonds with solid particles that have been coagulated and flocculated during the chemical pretreatment system described above. The pneumatic force of the rising foam, which is caused in part by the difference in density between the injected gas and the wastewater and in part by the flow rate of the incoming wastewater from the injection pump 240, in combination with the adhesive force between the foam and solids, is greater than a gravitational force acting on the solid materials in a generally opposite direction, and thus the solid materials rise with the foam and are separated from the pretreated wastewater within the fractionator 236. In an embodiment, an ozone generator 242 is upstream of the gas injection pump 240 for providing ozone as the gas for injection into the wastewater. Additionally or alternatively, the gas provided by injection pump 240 may be air, either alone, or in combination with ozone. Moreover, injection of gas into the foam fractionation tower 236, in combination with settlement of liquid from the foamate in the tower during residence of the wastewater 202 in the tower 236 and the circular current within the tower, results in continuous thickening of the foamate as it moves along the tower 236.

The addition of chemicals in different concentrations and compositions, or with different gas sources, may change the properties of the foam, including water and solid concentration, among others. Thus, it is possible to vary the system to provide wetter or drier, denser foam, as needed in specific applications. For example, it is to be appreciated that controlling the rate of gas injection and throttling the liquid discharge from the tower 236 affects the level of the liquid-foam interface in the tower 236, the volume and moisture of the foamate, and the clarity of the liquid fraction or effluent discharged, along with the recovery of solids. Additionally, adjusting the feed rate to the tower 236 affects the residence time in the tower 236 and the clarity of the liquid fraction and the recovery of solids. Each of these are factors for consideration in adjusting or designing the system 200 according to the composition of specific embodiments of wastewater 202, among others. Further, injection of ozone as the gas may serve as a disinfectant to wastewater 202 in the tower 236. Viruses and bacteria may also be removed from the tower 236 through physical separation by attachment to the foamate that exits the tower 236.

It is to be appreciated that the embodiments of the foam fractionation (FF) system and methods described herein contain several advantages over DAF systems and methods. For example, DAF cannot adequately recover solids without the use of polymers, but FF can. It is believed that FF is successful for recovery of solids without addition of polymers based on a number of different parameters between the two systems including, without limitation, differences in bubble size distribution, stress state at the gas-liquid interface, rate of bubble coalescence, gas flow rate, surface tension, dimensions of the systems, run time or residence time, gas to water ratio, and surfactants, among others.

Further, FF systems and methods are advantageous because the capital cost for equivalent flow rate will be 40 to 70% lower for FF than DAF in one non-limiting example. Moreover, FF systems and methods require less monitoring and adjustment during operation, and are easier to maintain. For example, on a DAF, fine tuning involves dialing in the chemistry, adjusting the flow rate, adjusting the weir level, adjusting the skimmer timing, adjusting the percent recycle of clean water with added air, and adjusting the air pressure and flow rate. The DAF has a recirculation pump, a compressor, and a motorized skimmer. By comparison, FF systems and methods include a recirculation pump, a discharge valve, and an air adjustment valve. As such, FF systems and methods have fewer moving parts and are easier to maintain.

Further, with FF systems and methods, fine tuning includes dialing in the chemistry, adjusting the flow rate, adjusting the discharge valve, and adjusting the air flow rate. Another advantage of FF is that one can run the unit in an enrichment mode where a portion of the foamate can be recycled for further concentrating. Such recycling of the foamate is not possible with DAF systems. A further advantage of FF is that the solids content of the foamate can be increased and clean effluent can be intermittently used to backwash the foamate collection system. For plants that have multiple processing operations (e.g., fish, shrimp, crab processing plants, etc.) where the flow rate can range from 60,000 gallons per day to 600,000 gallons per day, the lower cost of a FF system versus a DAF would allow the plant to have several FF reservoirs or towers for the cost of a single DAF. As such, plants can ramp up or down the number of FF systems in service depending on the flow rate. Without the use of robust chemistry, the DAF will need to have a plate pack or baffle plates in the DAF Tank. The FF tower has no obstructions and is therefore also easier to clean. Despite the advantages of using a FF tower instead of a DAF tank in certain applications, the present disclosure expressly contemplates the use of a DAF tank instead of a FF tower as well as other systems, devices, and methods for separating solids from wastewater. As such, the present disclosure is not limited to wastewater treatment systems and methods using only a FF tower, but rather, includes any other device, system, or method now known or developed in the future for separating solids from wastewater.

After separation in the foam fractionation tower or reservoir 236, the treated liquid fraction, or the wastewater with the solids separated therefrom, which may also be referred to as the wastewater effluent, is discharged from the fractionator 236 along line 244 to a fine screen 246 for removing any remaining particulate solids. The effluent then flows through an ultraviolet processing unit 248, which destroys any residues of chemical oxidants such as peracetic acid if it is added in the floc tube 222 with light in the ultraviolet spectrum. The ultraviolet processing unit 248 acts as a failsafe for disinfection. In certain embodiments, the screen 246 and the ultraviolet processing unit 248 are not included in the system 200, as the same are not necessary to provide effluent of sufficient quality and composition. Finally, after exiting the ultraviolet processing unit 248, the effluent flows to a treated wastewater discharge 250, which may be an existing effluent outfall into a body of water, for example.

The recovered solids or foamate produced by the fractionator 236 flows from the fractionator 236 into a sludge tank 252 along line 254. The solids can be thickened (e.g., any residual water removed from the solids) through gravity separation or by adjusting the pH and adding chitosan, a natural flocculant. Thickening of the solids produces decantate, which collects at a bottom or base of the sludge tank 252. The decantate is drained back to the wastewater sump 204 for additional processing, as above, via line 256. The decanted solids remaining in the sludge tank 252 are then pumped with pump 258 along line 260 to a transport bin for recycling the recovered solids offsite.

In some embodiments, the solids and/or foamate from the fractionator 236 are first received at foamate tank 253 along line 254 before passing to the sludge tank 252. The foamate tank 253 is configured to break down the foamate to a liquid containing particulate organic matter. For example, in some embodiments, the foamate tank 253 includes a motor with a blade, wherein the motor rotates the blade to break down the foamate into water or into a foam and water combination. As such, the foamate tank 253 reduces the volume of foamate transported through system 200. In some embodiments, the blade can be a large knife type blade, an auger, a paddle, a mixing paddle, a propeller, or any other type of rotary blade. In one or more embodiments, one or more additives are added to foamate tank 253 to further reduce foam content, although the same is not required.

In the industry, the motor and blade combination may be referred to as a "foam buster." As such, the foamate tank 253 includes a foam buster in the foamate tank 253, in some embodiments. In one or more embodiments, the foam buster may be located in an external location in fluid communication with the foamate tank 253, preferably upstream of the foamate tank 253 along line 254. The broken down solids and foamate in the foamate tank 253 are then pumped from the foamate tank 253 along line 257 by pump 255 to sludge tank 252. For clarity, line 257 includes the line connecting foamate tank 253 to pump 255 and connecting pump 255 to sludge tank 252. In some embodiments, the foamate tank 253 and pump 255 are omitted and the foamate and solids are sent directly to sludge tank 252 along line 254.

In some embodiments, processing the wastewater 202 with system 200 produces decantate at sludge tank 252 that is sufficiently clear of harmful oils, fats, bacteria, and viruses such that the decantate can be discharged without further processing. As such, the decantate can be pumped from sludge tank 252 to line 244 via line 257. The decantate then passes through fine screen 246 and the UV system 248 before being discharged at 250. In other embodiments, the decantate is sent via line 257 directly to an outfall without further processing by the screen 246 and UV system 248. In one or more embodiments, the system 200 does not include fine screen 246, but rather, decantate is sent directly to UV system 248.

The above system 200 can significantly reduce the content of organic material in wastewater, as described below with reference to FIGS. 5-7. It is believed that reduction in organic material includes reduction in bacterial and viral content is the result of one or more of the following: (i) adding ferric sulfate or peracetic acid, or both, to the wastewater before storage in the equalization tanks; (ii) coagulating and flocculating the solids with the FF tower, whereby viruses and bacteria are removed with the solids; (iii) adding ozone to the FF tower; and (iv) passing the wastewater through the UV disinfectant system.

As such, an embodiment of a method for treating wastewater utilizing system 200 includes pretreating the wastewater 202 with the floc tube 226 and at least one chemical pump (e.g., at least one of chemical pumps 228, 230, 232, or in other embodiments, by manual addition or some other form of addition). In an embodiment, the pretreating includes adding ferric sulfate to the wastewater 202 to form a pretreated wastewater mixture in the floc tube 226. Then, the method continues by pumping, via feed pump 222, the pretreated wastewater mixture into a foam fractionation tower 236. In an embodiment, the foam fractionation tower 236 is operated to separate the pretreated wastewater into a foamate and a remaining effluent within the tower 236, as described above. The method may then terminate by discharging the effluent and the foamate along separate flow paths for further processing, as above.

In further embodiments of the method, pretreating the wastewater includes, after adding the ferric sulfate, adding peracetic acid to the wastewater 202 to form the pretreated wastewater mixture, wherein adding the peracetic acid may include the second chemical pump 230, or some other method of addition, including manually. Adding at least one of, or potentially both, of the ferric sulfate and the peracetic acid lowers a pH of the pretreated wastewater mixture to a level at or below an isoelectric point of the wastewater 202. Then, in various embodiments, before pumping the pretreated wastewater mixture into the foam fractionation tower 236, sodium hydroxide is added to the pretreated wastewater mixture (e.g., after adding ferric sulfate and peracetic acid, in an embodiment), wherein adding the sodium hydroxide includes raising the pH of the pretreated wastewater mixture. Preferably, the resulting pH of the pretreated wastewater mixture is between 6.5 and 7.5, although in other embodiments, the resulting pH may be different based on the concentration of chemicals in the pretreated wastewater following pretreatment.

In yet further embodiments, the pumping the pretreated wastewater mixture into the foam fractionation tower 236 includes feeding the pretreated wastewater mixture into the foam fractionation tower 236 proximate a first end of the foam fractionation tower opposite a base of the foam fractionation tower. In an embodiment where the tower 236 is vertical, the first end may be an upper or top end, and the base may be a lower or bottom end, as described below with reference to FIG. 4. Preferably, the tower 236 is operated countercurrently, such that the wastewater 202 is added to the tower 236 in a direction opposite to a direction of a current flow within the tower 236 (e.g., in an embodiment, wastewater 202 is added in a downward direction against the vertical current of the foam and liquid in the tower 236).

Additional processing of the effluent remaining in the tower 236 can include discharging the effluent proximate the base of the foam fractionation tower 236 and flowing the effluent through at least one of a mesh screen or an ultraviolet treatment system to provide a refined effluent. Preferably, the effluent is flowed through both a mesh screen and the ultraviolet treatment system, although the same is not necessarily required. Finally, the effluent can be discharged to an existing wastewater discharge, or some other downstream receiving source, such as a wastewater treatment plant.

Additional processing of the foamate from the tower 236 includes discharging the foamate from the first end of the foam fractionation tower 236 opposite the base, preferably to the sludge tank 252, although other embodiments include discharging the foamate directly to some other receiving source, such as a landfill, or a fertilizer or compost processing plant. In embodiments where the foamate is received in the sludge tank 252, the method further includes, after the discharging the foamate, dewatering the foamate. Dewatering the foamate can include, in various alternative embodiments, separating water from the foamate by gravity separation in a sludge tank or by adjusting a pH of the foamate and adding chitosan to the foamate. Chitosan is a natural flocculant that results in additional dewatering of the solids by causing colloids and other suspended particles in liquids to aggregate, forming a floc that is separate from the remaining wastewater decantate. As above, in an embodiment, the decantate may be returned to the sump 204 for reintroduction to the system 200, thus creating a fluid loop within the system 200. In some embodiments, the decantate is sent directly to the outfall via the ultraviolet processing unit 248, as above.

Figure 3:
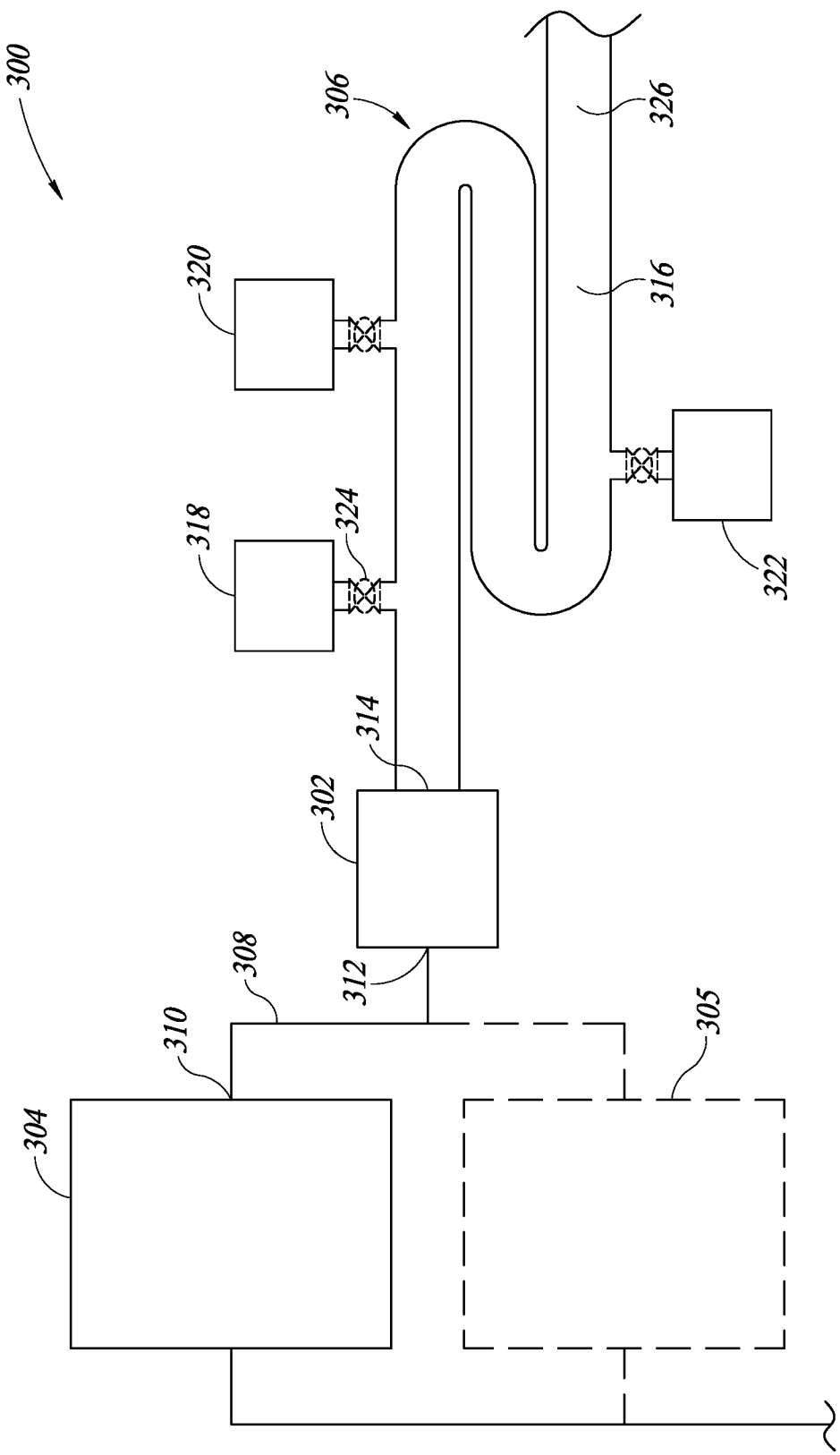
FIG. 3 is a schematic of a chemical pretreatment system of the system of FIG. 2 illustrating an equalization tank, a feed pump, at least one chemical pump, and a floc tube in fluid communication with each other.

FIG. 3 illustrates an embodiment of a chemical pretreatment system 300 described above with reference to the system 200 in FIG. 2. The chemical pretreatment system 300 includes a feed pump 302 in fluid communication with at least one equalization tank 304 and a floc tube 306. As illustrated, the feed pump 302, the equalization tank 304, and the floc tube 306 define a flow path for wastewater stored in the tank 304, from the tank 304 to the pump 302 along line 308 from an outlet 310 of the tank 304 to an inlet 312 of the pump 302. In other words, the equalization tank 304 is upstream of the pump 302 along the flow path through the system 300, such that during operation, the equalization tank 304 provides wastewater stored in the tank to the inlet 312 of the pump 302. A second equalization tank 305 is illustrated in dashed or broken lines and fluidly connected in series with the equalization tank 304 to indicate that in some embodiments, the second tank 305, or further additional tanks, may or may not be required, but are expressly contemplated by the present disclosure.

The floc tube 306 is fluidly connected to an outlet 314 of the pump 302 and is preferably downstream from the pump 302, such that the floc tube 306 receives wastewater output from the pump 302 via the equalization tank 304. As illustrated, the floc tube 306 includes a plurality of tubes or pipes 316 arranged in a serpentine and overlapping arrangement, such that flow along the floc tube 306 is tortuous, which provides mixing of the wastewater as it moves through the floc tube 306. Although the floc tube 306 is illustrated as having three pipes or tubes 316, it is to be appreciated that in practice, the floc tube 306 may include significantly more (e.g., more than 10 total pipes or tubes), or potentially less, than the number of tubes 316 illustrated. It is to be appreciated that in alternative embodiments, one or more mixing tanks may be substituted for the floc tube 306 along the flow path through system 300, wherein the mixing tanks provide mixing of the wastewater and added chemicals, rather than the floc tube 306.

FIG. 3 further illustrates that the system 300 includes at least one chemical pump 318 fluidly connected with the flow path downstream of the pump 302. In an embodiment, the at least one chemical pump 318 includes at least three chemical pumps, including a first chemical pump 318, a second chemical pump 320, and a third chemical pump 322 arranged in sequential order and spaced along the flow path. It is to be appreciated that the chemical pumps 318, 320, 322 can be arranged anywhere along the flow path, including along various locations of the floc tube 306, both upstream of the floc tube 306 and downstream of the pump 302, or even downstream of the floc tube 306. Further, each of the chemical pumps 318, 320, 322 are illustrated as being connected into the flow path with a valve 324, which has been shown in dashed or broken lines to indicate that it may be included in some embodiments, and excluded from others, depending on whether it is desirable to control, separate from control of the pumps 318, 320, 322, the addition of chemicals into the wastewater. It is to be appreciated that the system 300, as well other systems and methods described herein, may use various valves, fittings, and other fluid coupling or control devices that have not described simply for purposes of clarity to avoid obscuring the features of the preferred embodiments.

In an embodiment, the first chemical pump 318 provides ferric sulfate to wastewater from the feed pump 302, the second chemical pump 320 provides peracetic acid to the wastewater, and the third chemical pump 322 provides sodium hydroxide to the wastewater, in sequential order, with spacing amongst the chemical pumps 318, 320, 322 allowing for mixing and equalization of the wastewater prior to further chemical addition. In other embodiments, the chemicals are added in different order, or all at the same time. As a result, the wastewater exiting the floc tube 306 along line 326 fluidly connected to a last or final one of the plurality of tubes 316 is chemically pretreated wastewater that is provided to a foam fractionation system described with reference to FIG. 4.

Figure 4:
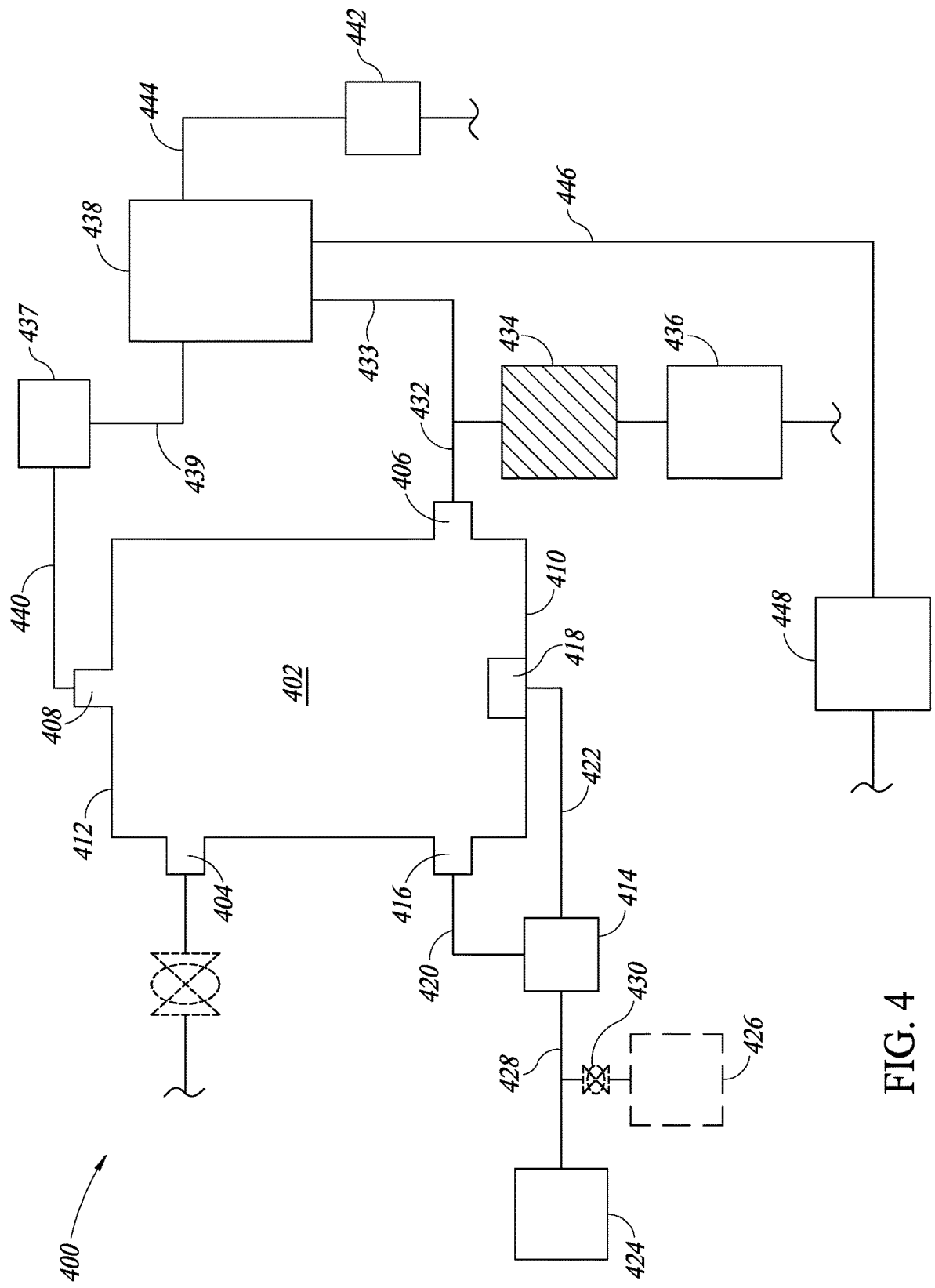
FIG. 4 is a schematic of a foam fractionation system of the system of FIG. 2 illustrating a reservoir, a gas injection pump, and a gas source in fluid communication with each other.

FIG. 4 illustrates an embodiment of a foam fractionation system 400 that receives the chemically pretreated wastewater from the pretreatment system 300. In other words, the foam fractionation system 400 is in fluid communication with the pretreatment system 300 and is preferably downstream from the pretreatment system 300 within a broader processing system, such as system 200. The foam fractionation system includes a reservoir 402 having a fluid inlet 404 through which wastewater, and preferably chemically pretreated wastewater is received, a fluid outlet 406 for discharging effluent, and a foamate outlet 408 for discharging foamate. The reservoir 402 further includes a first end 410, which in an embodiment, is a lower or bottom end, and a second end 412 opposite the first end 410, which in an embodiment, is an upper or top end.

A gas injection pump 414 is in fluid communication with the reservoir 402 through a fluid loop including lines 420 and 422 between the gas injection pump 414 and the reservoir 402. Specifically, the line 420 is fluidly coupled between the pump 414 and a recirculation outlet 416 proximate the first end of the reservoir 402. Wastewater near the first end 410 of the reservoir 402 is drawn into the gas injection pump 414 along line 420. The gas injection pump 414 then injects gas into the wastewater, and pumps the gas injected wastewater to a gas inlet 418 in the first end 410 of the reservoir 402 along line 422, thus creating a fluid loop between the reservoir 402 proximate the first end 410 and the gas injection pump 414.

A gas source 424 is upstream of the gas injection pump 414 and provides gas along line 428 to the pump 414 for injection into the wastewater. In an embodiment, the gas source 424 is an ozone generator, or an ozone tank. In an alternative embodiment, the gas source 424 is an air source 426, which is connected to line 428 by a valve 430, wherein the air source 426 may be any one of a compressor, an air tank, or a one way valve that provides air to the pump due to the negative pressure differential generated by the pump along line 428, for example. In yet further embodiments, the gas source 424 generally includes both an ozone generator 424 and an air source 426, wherein both air and ozone are provided as gas for injection in the wastewater. In still further embodiments, other gases and respective gas generators may be used as the gas source 424.

The system 400 further includes a flow outlet path 432 in fluid communication with the fluid outlet 406 of the reservoir 402. A screen 434 is in the flow outlet path 432 downstream from the reservoir 402, wherein during operation, the screen receives effluent flowing from the fluid outlet 406 of the reservoir 402 and removes any residual fine particulate matter in the effluent. An ultraviolet treatment system 436 is in fluid communication with the screen 434 downstream from the screen 434 along flow outlet path 432. The ultraviolet treatment system 436 receives effluent from the screen 434 and uses light in the ultraviolet spectrum to destroy bacteria and viruses present in the effluent before discharge from the system 400.

The foamate outlet 408 is in fluid communication with a sludge tank 438 downstream from the reservoir 402 along line 440. The sludge tank 438 receives foamate from the foamate outlet 408 following operation of the system 400, as described above. The sludge tank 438 stores the foamate to enable dewatering before further downstream processing. For example, dewatering can occur through gravity separation or by adjusting the pH of the foamate and adding chitosan. In some embodiments, the foam fractionation system 400 includes a foamate tank 437 upstream from the sludge tank 438 along line 440. The foamate tank 437 may be a barrel or other reservoir including a foam buster, as described herein, for reducing a volume of the foamate by breaking down the foam in the foamate. The broken down foamate and solids are then provided from foamate tank 437 to sludge tank 438 along line 439 for storage and dewatering in the sludge tank 438, as described herein. In some embodiments, a pump is positioned along line 439 for pumping the broken down foamate and solid mixture from the foamate tank 437 to the sludge tank 438, similar to pump 255 in FIG. 2.

The dewatered solids are then collected and pumped out of the sludge tank 438 by a pump 442 along line 444 and sent to a landfill, a fertilizer processing plant, a compost processing plant, or some other destination. A decantate line 446 is in fluid communication with the sludge tank 438 and a sump 448 for providing decantate (e.g., wastewater remaining after dewatering the foamate in the sludge tank 438) to the sump 448. As described with reference to FIG. 2, the sump 448 may be in fluid communication with a sump pump, a rotary screen, and one or more equalization tanks in order to establish a fluid loop within a broader system. Further, in some embodiments, decantate can be provided from sludge tank 438 to line 432 via line 433, wherein the decantate is processed through screen 434 and UV treatment system 436 before being discharged, as described with reference to FIG. 2.

Experimental Test Results

The following data and experimental test results further illustrates the embodiments of the present invention and is not to be construed as limiting the present disclosure in any manner. Field trials were conducted at a farmed salmon processing plant. Samples of wastewater were collected to evaluate the wastewater and to test the most effective chemical treatment options. Foam fraction tests were conducted on a batch basis on bench top using a plastic settleometer, an aquarium air pump, and a ceramic sparging stone. Small scale piloting was done using a Foam Fractionator operating in concurrent mode and on a batch basis. Gas, such as air and ozone, was added by adding a Mazzei injector to the feed line to the Foam Fractionator.

Chemical pretreatment before foam fractionation on a pilot scale was accomplished by pumping the wastewater through a full-scale floc tube with chemical injection pumps. Wastewater exiting the Floc Tube was diverted to a feed tote for the foam fractionator. A submersible pump was used to recirculate the wastewater through the Foam Fractionator for about 10-15 minutes or when the wastewater turned clear, which, in some cases, was more or less than 10-15 minutes. Samples were collected onsite and tested for total solids, salinity, pH, UV transmittance. Samples were further subjected to a multiwave length scan using a UV-VIS spectrophotometer. Some samples of the raw or untreated wastewater and the treated wastewater were sent to an outside lab for analysis.

The volume of foamate and treated wastewater were collected and measured volumetrically. The solids content was measured using standard methods. A mass balance was done to validate the data based on known quantities of the volume and solids content of the feed, foamate, and treated wastewater.

Table I below represents the parameters and lab results for a first experimental run, wherein the results of the spectrophotometer testing are displayed in graphical form in corresponding FIG. 5. FIG. 5 represents multiwave scans for the wastewater before and after treatment according to the parameters specified in Table I. The y-axis represents UV absorbance and the x-axis is wavelength, in nanometers, wherein line 502 corresponds to raw wastewater before treatment, and line 504 corresponds to wastewater after treatment as in Table 1.

TABLE 1

| | | Run #1 | | | | |
| --- | --- | --- | --- | --- | --- | --- |
| | | Chemical Dosing | | | After Chem | |
| | Raw Wastewater | Ferric | Peracetic | Caustic, | addition | Ozone |
| Salinity, ppt | % UVT | Sulfate, ppm | Acid, ppm | ppm | pH | Addition |
| 15.11 | 14.06 | 1.223 | 0 | 1,008 | 6.6 | Yes |
| Liquid Fraction, % UVT | 77.98 | | | | | |
| Foamate: | 11.8 | liters | | | | |
| Liquid Fraction: | 44.01 | liters | | | | |
| Total: | 55.81 | liters | | | | |
| Foamate % volume | 21% | | | | | |

| | Outside Lab Results | | | Log |
| --- | --- | --- | --- | --- |
| | FF Feed | FF Effluent | % diff | Reduction |
| Nitrite (N), mg/L | 0.012 | ND | −100% | |
| Nitrate (N), mg/L | 0.062 | 0.138 | 123% | |
| Organic Nitrogen(N), mg/L | 92.8 | 12 | −87% | |
| TKN (Calc.), mg/L | 98.6 | 17.7 | −82% | |
| BOD, mg/L | 426 | 83.9 | −80% | |
| CBOD, mg/L | 388 | 81.9 | −79% | |
| COD, mg/L | 1.090 | 381 | −65% | |
| Salinity, g/L | 15.5 | 15.9 | 3% | |
| Ammonia (N), mg/L | 5.8 | 5.7 | −2% | |
| Oil & Grease, mg/L | 14 | ND | −100% | |
| pH | 6.25 | 6.97 | | |
| TSS, mg/L | 926 | 33.6 | −96% | |
| *E. coli*, CFU/100 mL | ND | ND | | |
| *Entercoccus* spp., CFU/100 mL | 35,000 | 32 | −99.9% | 3.04 |
| Total Coliforms, CFU/100 mL | 82,000 | 64 | −99.9% | 3.11 |

This experimental run was based on a higher dosing of ferric sulfate with no addition of peracetic acid. The foamate was 21% of the wastewater volume. Based on subsequent trials, this results appears to have been caused by using a commercially available vacuum to extract the foamate, as the foamate was allowed to dewater excessively in the foam fractionation tower. Regarding the liquid fraction discharged from the foam fractionation tower, the lab results indicate a significant reduction in pollutants and organisms with the exception of nitrate. However, the nitrate value is acceptably small and the increase is likely due to the oxidation of nitrogenous compounds. The % UVT improved over 5 fold, wherein the % UVT is related to the clarity and purity of the liquid fraction.

In a second experimental test, four samples were analyzed: the raw wastewater, the raw wastewater after chemical addition (and allowed to settle), and the liquid fraction from the foam fractionation tower for two runs. Once again there was a significant reduction in UV absorbing compounds. It is interesting to note that Run #4 was run with ferric sulfate at 481 ppm versus 1,069 ppm for Run #5. The higher ferric dose with foam fractionation performed the best, followed by the lower ferric dose and foam fractionation, followed by chemical treatment only and settling. Table II summarizes the parameters and test results for Runs #4 and #5 and FIG. 6 is as graphical representation of multiwave scans for the various samples according to the above and the treatment parameters specified in Table 2.

rose to the top of the unit and exited through a drain line. The foam fractionator was adjusted for wetter foam but the overall result was a reduction in foamate volume to 8.6% of the wastewater volume. The solids mass balance reconciled to −1%. Based on the % UVT of the liquid fraction, reducing the foamate volume did not adversely affect the performance, although Run #5 was conducted using almost double the dose of ferric sulfate compared to Run #4.

Figure 6:
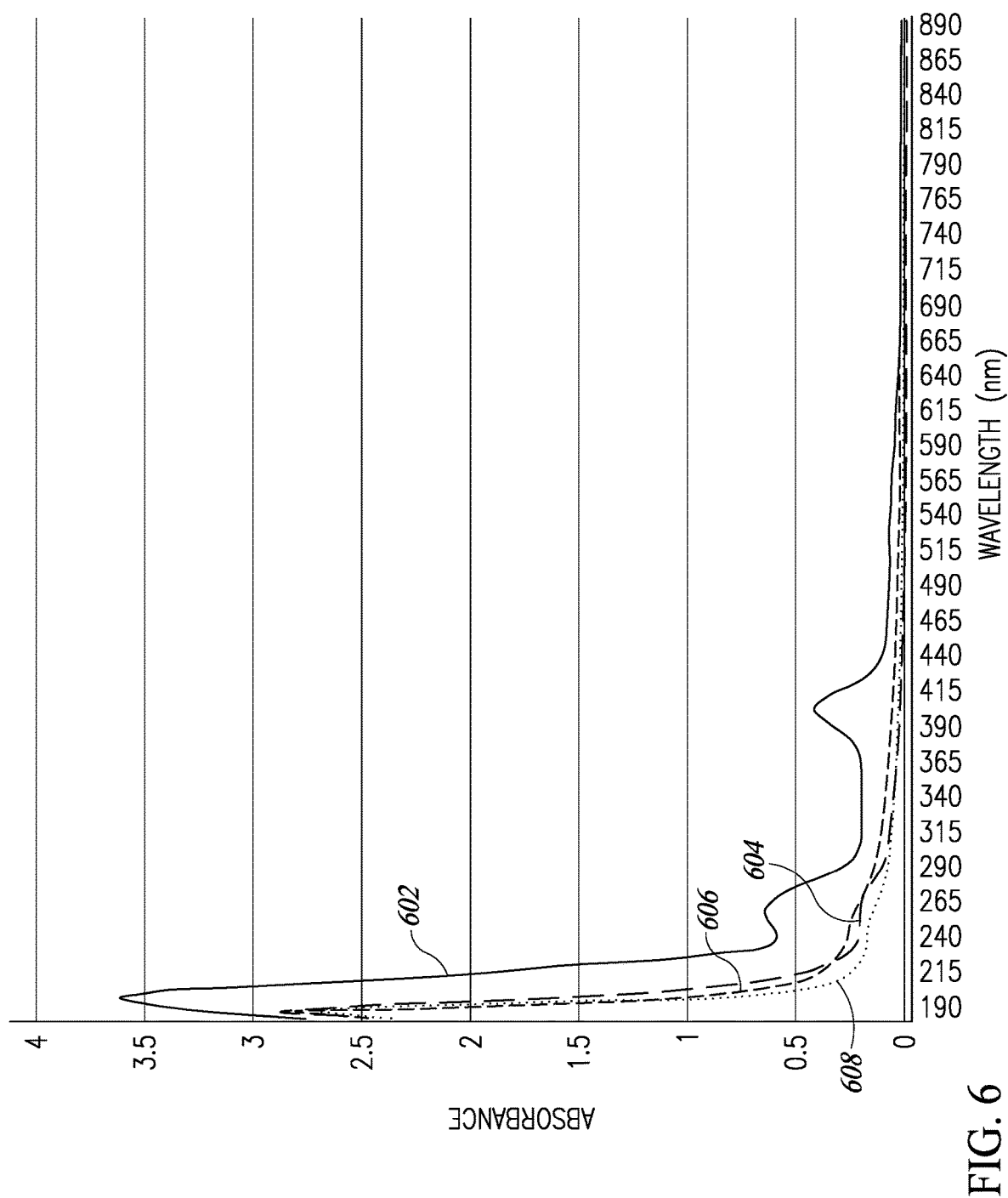
FIG. 6 is a graphical representation of multiwave spectrophotometer data for raw wastewater, raw wastewater after chemical pretreatment and settlement, and two runs of chemically pretreated wastewater after foam fractionation according to an embodiment of the present disclosure.

In FIG. 6, the y-axis represents UV absorbance and the x-axis is wavelength, in nanometers. Line 602 corresponds to UV absorbance of raw wastewater, line 604 corresponds to UV absorbance after chemical pretreatment and settling, line 606 corresponds to Run #4 treated liquid fraction, and line 608 corresponds to Run #5 treated liquid fraction.

In a third experimental test, a full scale system, such as system 200 described herein, was used to process wastewater at a farmed salmon processing plant. Samples of the untreated and treated wastewater from the system were

TABLE 2

Run #4

| Raw Wastewater | | Chemical Dosing | | | After Chem addition | Ozone | |
|---|---|---|---|---|---|---|---|
| Salinity, ppt | % UVT | Ferric Sulfate, ppm | Peractic Acid, ppm | Caustic, ppm | pH | Addition | Reflux |
| 13.26 | 24.95 | 481 | 6 | 397 | 6.54 | Yes | Yes |
| Liquid Fraction, %UVT | 56.11 | | | | | | |
| Foamate: | 18.1 | liters | | | | | |
| Liquid Fraction: | 47.91 | liters | | | | | |
| Total: | 66.01 | liters | | | | | |
| Foamate % volume | 27% | | | | | | |

| | Outside Lab Results | | | In House Lab Results | | |
|---|---|---|---|---|---|---|
| | TS, mg/l | TS, gm | | TS, mg/l | TS, gm | |
| Foamate: | 15,400 | 278.74 | | 15,963 | 288.93 | |
| Liquid Fraction: | 13,000 | 622.83 | 901.57 | 14,237 | 682.09 | 971.02 |
| FF Feed: | 15,400 | 1,016.55 | −11% | 15,400 | 1,016.55 | −4% |

Run #5

| Raw Wastewater | | Ferric | Peracetic | Caustic, | addition | Ozone | |
|---|---|---|---|---|---|---|---|
| Salinity, ppt | % UVT | Sulfate, ppm | Acid, ppm | ppm | pH | Addition | Reflex |
| 13.26 | 24.95 | 1,069 | 6 | 992 | 6.54 | Yes | Yes |
| Liquid Fraction, % UVT | 68.23 | | | | | | |
| Foamate: | 6 | liters | | | | | |
| Liquid Fraction: | 63.71 | liters | | | | | |
| Total: | 69.71 | liters | | | | | |
| Foamate % volume | 8.6% | | | | | | |

| | Outside Lab Results | | | In House Lab Results | | |
|---|---|---|---|---|---|---|
| | TS, mg/l | TS, gm | | TS, mg/l | TS, gm | |
| Foamate: | 21,600 | 129.60 | | 18,410 | 110.45 | |
| Liquid Fraction: | 15,100 | 962.02 | 1,091.62 | 14,330 | 912.96 | 1,023.42 |
| FF Feed: | 14,900 | 1,038.68 | 5% | 14,900 | 1,038.68 | −1% |

The foamate for Run #4 was extracted using a commercially available vacuum, resulting in the foamate being 27% of the wastewater volume. In order to validate this number, a mass balance was done on the total solids entering and exiting the foam fractionator. Using the in-house total solids measurements, the mass balance reconciled to −4% difference between what entered and exited the foam fractionator.

For Run #5, the vacuum was not used and the top cover for the foam fractionator was bolted back on. The foamate analyzed in an accredited lab. The wastewater feed rate was 55 gallons per minute. The pollutant reductions were as high as 91% for biochemical oxygen demand, 95% for total suspended solids, 41% for ammonia-nitrogen, 100% for oil and grease, 85% for total Kjeldahl nitrogen, and 100% for enterococcus bacteria. The influent and effluent waters were tested using a Hach DR 6000 UV-Vis spectrophotometer, with the results shown in FIG. 7.

Figure 5:
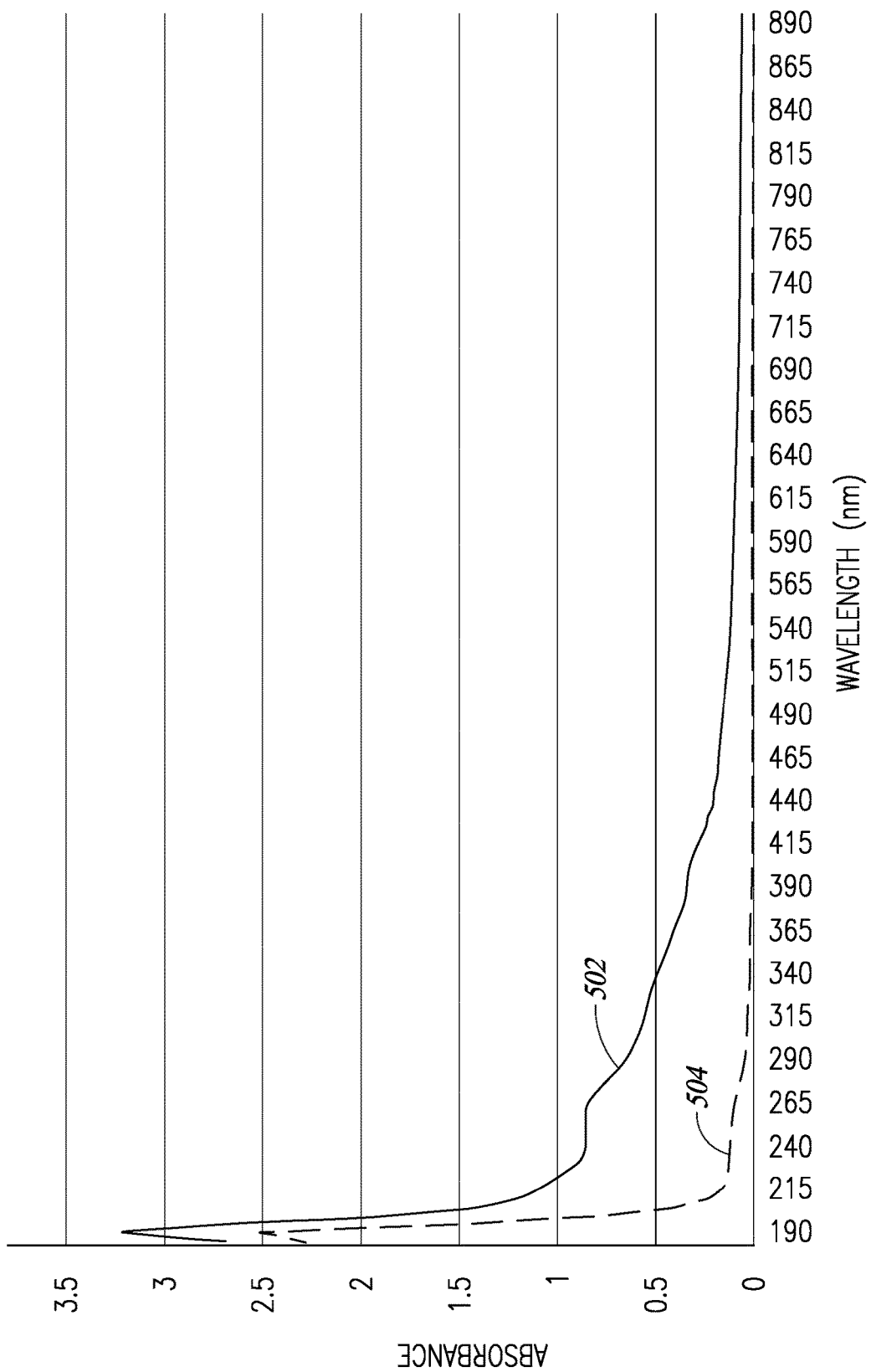
FIG. 5 is a graphical representation of multiwave spectrophotometer data for raw wastewater and chemically pretreated wastewater after foam fractionation according to an embodiment of the present disclosure.
Figure 7:
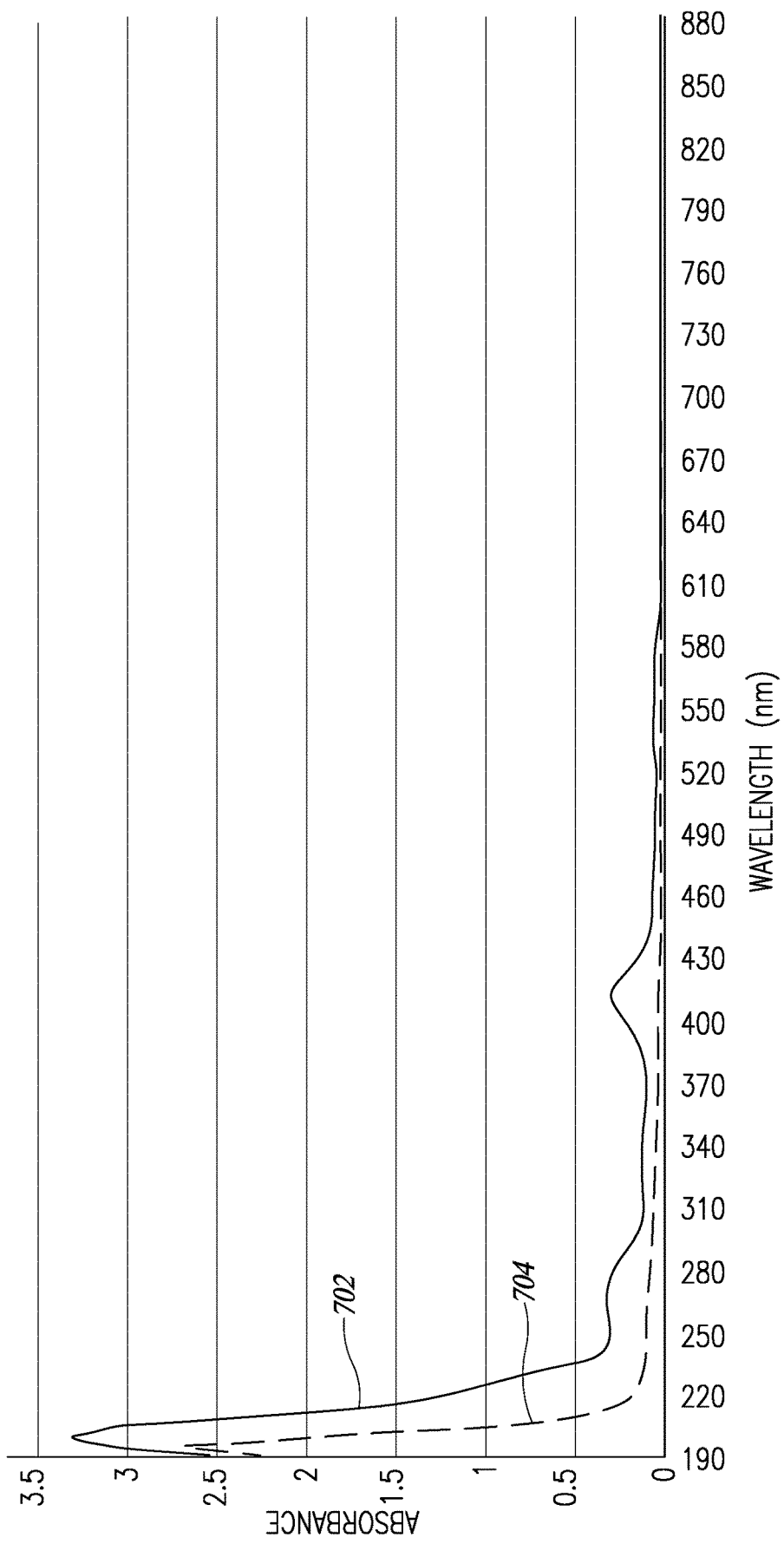
FIG. 7 is a graphical representation of multiwave spectrophotometer data for raw wastewater and chemically pretreated wastewater after foam fractionation according to an embodiment of the present disclosure.

In FIG. 7, the y-axis values are absorbance, as in FIGS. 5 and 6, and the x-axis values are wavelength in nanometers. Line 702 represents the influent UV absorbance and line 704 represents the effluent UV absorbance. The system increased the percentage ultraviolet transmittance from 49.8% for the influent to 80.9% for the effluent. UV cleaning or disinfectant systems each have a different design capacity of UV transmittance in order to allow for effective operation. In other words, different UV systems may be able to operate and clean wastewater with at least 25% UV transmittance, at least 50% UV transmittance, or at least 65% UV transmittance in some embodiments. In general, UV systems that are able to operate with lower UV transmittance (e.g., operate to clean dirtier wastewater with higher UV absorbance because of increased organic matter content in the water) have a considerably higher price. As such, the increase in UV transmittance from 49.8% to 80.9% from treatment of wastewater with embodiments of the present disclosure allows for processing of the effluent with a cheaper UV system. For example, in some embodiments, the UV systems described herein are designed to operate with wastewater of at least 65% UV transmittance. As such, wastewater effluent with an 80.9% UV transmittance is considerably greater than the operational capacity of the UV systems described herein.

As will be readily appreciated from the foregoing, the present disclosure achieves a system and method for recovering solids from wastewater wherein the wastewater effluent has significantly lower concentrations of pollutants, chemicals, bacteria, and viruses. The effluent can be discharged to treatment plants for further processing or directly to existing bodies of water with significantly reduced environmental impacts. The recovered solids can be used as feeds and fertilizer.

In the above description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with wastewater processing systems and methods have not been shown or described in detail to avoid unnecessarily obscuring descriptions of the embodiments.

As used herein, unless the context dictates otherwise, the term "line" shall be construed as meaning "a device for conveying fluids" and includes, without limitation, tubes, pipes, conduits, hoses, mains, ducts, channels, canals, conveyors, pipelines, drains, tubing, piping, siphons, and hollow cylinders.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

This application claims the benefit of, and priority to U.S. Provisional Application No. 62/826,428 filed Mar. 29, 2019; International Patent Application No. PCT/US2020/025241 filed Mar. 27, 2020; and U.S. patent application Ser. No. 17/599,943 filed on Sep. 29, 2021, the entire contents of which are incorporated by reference herein.

The invention claimed is:

1. A method, comprising:
pretreating wastewater containing organic matter, the pretreating including adding one or more pretreatment chemicals to the wastewater to form a pretreated wastewater mixture;
supplying the pretreated wastewater mixture into a foam fractionation system, whereby the pretreated wastewater mixture is separated into a foamate and an effluent within the foam fractionation system absent a foaming agent, wherein the foamate comprises foams on which at least a portion of the organic matter is adsorbed;
discharging the foamate from the foam fractionation system; and
adding a natural flocculant to the foamate, excluding adding at least one of anionic polymers and polyacrylamides.

2. The method of claim 1, wherein the one or more pretreatment chemicals include ferric sulfate, and a pH adjuster suitable to adjust the pretreated wastewater mixture to a pH level at or below an isoelectric point of the wastewater.

3. The method of claim 2, wherein the pH level is between 6.5 and 7.5.

4. The method of claim 2, wherein the pH adjuster is selected from the group consisting of sodium bicarbonate, sodium hydroxide, and sulfuric acid.

5. The method of claim 2, wherein the one or more pretreatment chemicals further comprises one or more oxidants selected from hydrogen peroxide, peracetic acid, and a combination thereof.

6. The method of claim 1, wherein the adding the one or more pretreatment chemicals includes adding ferric sulphate first followed by adding sodium hydroxide.

7. The method of claim 1, wherein the adding the natural flocculant to the foamate includes adding chitosan to the foamate.

8. The method of claim 1, further comprising:
after the supplying, discharging the effluent, the discharging including flowing the effluent through at least one of a mesh screen or an ultraviolet treatment system to provide a refined effluent and discharging the refined effluent to a wastewater discharge.

9. The method of claim 8, wherein the refined effluent has an ultraviolet transmittance that is at least 30% greater than an ultraviolet transmittance of the wastewater prior to the pretreating.

10. The method of claim 1, further comprising:
after the discharging the foamate, dewatering the foamate, the dewatering the foamate including separating water from the foamate by gravity separation in a sludge tank.

11. The method of claim 10, wherein the dewatering the foamate further includes, before separating the water from the foamate by gravity separation, adding only the natural flocculant to the foamate and adjusting a pH of the foamate.

12. The method of claim 1, further comprising:
after the supplying the pretreated wastewater mixture into the foam fractionation system, retaining the pretreated wastewater mixture in the foam fractionation system for a residence time of at least 5 minutes before discharging the foamate.

13. A method, comprising:
pretreating wastewater containing organic matter, the pretreating including adding ferric sulfate to the wastewater first followed by adding sodium hydroxide to the wastewater to form a pretreated wastewater mixture;
supplying the pretreated wastewater mixture into a foam fractionation system, whereby the pretreated wastewater mixture is separated into a foamate and an effluent within the foam fractionation system absent a foaming agent, wherein the foamate comprises foams on which at least a portion of the organic matter is adsorbed; and
adding chitosan to the foamate, excluding adding anionic polymers and polyacrylamides to the foamate.

14. The method of claim 13, wherein the supplying the pretreated wastewater into the foam fractionation system further includes retaining the pretreated wastewater in the foam fractionation system for a residence time of at least 4 minutes.

15. The method of claim 13, further comprising:
after the supplying the pretreated wastewater mixture into the foam fractionation system, discharging the foamate to a sludge tank followed by the adding the chitosan to the foamate.

16. The method of claim 15, further comprising:
after the adding the chitosan to the foamate, dewatering the foamate in the sludge tank, including separating water from the foamate by gravity separation.

17. The method of claim 13, further comprising:
adding a pH adjuster to the foamate; and,
after adding the chitosan, dewatering the foamate in a sludge tank by gravity separation.

18. The method of claim 13, wherein the pretreating the wastewater further includes adding one or more of sulfuric acid, sodium bicarbonate, and hydrogen peroxide to the wastewater to form the pretreated wastewater mixture.

19. The method of claim 13, wherein the separated effluent from the foam fractionation system has an ultraviolet transmittance that is at least 30% greater than an ultraviolet transmittance of the wastewater prior to the pretreating.

20. The method of claim 13, wherein the supplying the pretreated wastewater mixture to the foam fractionation system includes supplying the pretreated wastewater mixture to the foam fractionation system absent a foaming agent.

* * * * *